(12) United States Patent
Mitsunobu et al.

(10) Patent No.: US 11,697,266 B2
(45) Date of Patent: Jul. 11, 2023

(54) PLATED STEEL

(71) Applicant: NIPPON STEEL CORPORATION, Tokyo (JP)

(72) Inventors: Takuya Mitsunobu, Tokyo (JP); Jun Maki, Tokyo (JP); Hiroshi Takebayashi, Tokyo (JP); Takehiro Takahashi, Tokyo (JP); Kohei Tokuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 45 days.

(21) Appl. No.: 17/435,613

(22) PCT Filed: Apr. 16, 2020

(86) PCT No.: PCT/JP2020/016714
§ 371 (c)(1),
(2) Date: Sep. 1, 2021

(87) PCT Pub. No.: WO2020/213680
PCT Pub. Date: Oct. 22, 2020

(65) Prior Publication Data
US 2022/0152983 A1    May 19, 2022

(30) Foreign Application Priority Data
Apr. 19, 2019  (JP) .................... 2019-080289

(51) Int. Cl.
*B32B 15/01*    (2006.01)
*C22C 38/04*    (2006.01)
(Continued)

(52) U.S. Cl.
CPC .......... *B32B 15/013* (2013.01); *B32B 15/012* (2013.01); *B32B 15/04* (2013.01);
(Continued)

(58) Field of Classification Search
CPC ..... B32B 15/013; B32B 15/012; B32B 15/04; B32B 15/043; B32B 15/18; C22C 18/00;
(Continued)

(56) References Cited

U.S. PATENT DOCUMENTS

| 7,534,502 B2 | 5/2009 | Honda et al. |
| 2019/0390303 A1 | 12/2019 | Tokuda et al. |

(Continued)

FOREIGN PATENT DOCUMENTS

| JP | 2002-302749 A | 10/2002 |
| JP | 2009-120947 A | 6/2009 |

(Continued)

*Primary Examiner* — Michael E. La Villa
(74) *Attorney, Agent, or Firm* — Birch, Stewart, Kolasch & Birch, LLP

(57) ABSTRACT

A plated steel includes: a steel; and a plating layer that is provided on a surface of the steel, in which the plating layer includes, by mass %, Al: 5.00% to 35.00%, Mg: 2.50% to 13.00%, Fe: 5.00% to 40.00%, Si: 0% to 2.00%, Ca: 0% to 2.00%, and a remainder of Zn and impurities, and in a cross section of the plating layer, the area fraction of a Zn solid-solution $Fe_2Al_5$ phase in which 5% or more of Zn is solid-soluted is 10% to 60% and the area fraction of a $MgZn_2$ phase is 10% to 90%.

20 Claims, 1 Drawing Sheet

(51) Int. Cl.
*C22C 38/02* (2006.01)
*C22C 18/00* (2006.01)
*C23C 2/06* (2006.01)
*C23C 2/20* (2006.01)
*C23C 2/28* (2006.01)
*C23C 2/40* (2006.01)
*C22C 18/04* (2006.01)
*C23C 2/02* (2006.01)
*C23C 28/02* (2006.01)
*C23C 2/26* (2006.01)
*C23C 30/00* (2006.01)
*C23C 2/12* (2006.01)
*B32B 15/04* (2006.01)
*B32B 15/18* (2006.01)
*C23C 2/04* (2006.01)
*C22C 38/00* (2006.01)

(52) U.S. Cl.
CPC ............ *B32B 15/043* (2013.01); *B32B 15/18* (2013.01); *C22C 18/00* (2013.01); *C22C 18/04* (2013.01); *C22C 38/02* (2013.01); *C22C 38/04* (2013.01); *C23C 2/02* (2013.01); *C23C 2/04* (2013.01); *C23C 2/06* (2013.01); *C23C 2/12* (2013.01); *C23C 2/20* (2013.01); *C23C 2/26* (2013.01); *C23C 2/28* (2013.01); *C23C 2/40* (2013.01); *C23C 28/02* (2013.01); *C23C 28/023* (2013.01); *C23C 28/025* (2013.01); *C23C 30/00* (2013.01); *C22C 38/00* (2013.01); *Y10T 428/12757* (2015.01); *Y10T 428/12792* (2015.01); *Y10T 428/12951* (2015.01); *Y10T 428/12958* (2015.01); *Y10T 428/12972* (2015.01); *Y10T 428/12979* (2015.01)

(58) Field of Classification Search
CPC ......... C22C 18/04; C22C 38/02; C22C 38/04; C22C 38/00; C23C 2/02; C23C 2/06; C23C 2/12; C23C 2/20; C23C 2/26; C23C 2/28; C23C 2/40; C23C 2/04; C23C 28/02; C23C 28/023; C23C 28/025; C23C 30/00; C23C 30/005; Y10T 428/12792; Y10T 428/12757; Y10T 428/12951; Y10T 428/12958; Y10T 428/12972; Y10T 428/12979
See application file for complete search history.

(56) References Cited

U.S. PATENT DOCUMENTS

| | | |
|---|---|---|
| 2020/0002798 A1 | 1/2020 | Tokuda et al. |
| 2020/0017937 A1 | 1/2020 | Mitsunobu |
| 2022/0112589 A1* | 4/2022 | Mitsunobu ............... C23C 2/12 |

FOREIGN PATENT DOCUMENTS

| | | |
|---|---|---|
| JP | 2010-070810 A | 4/2010 |
| JP | 4579715 B2 | 11/2010 |
| JP | 2015-214747 A | 12/2015 |
| JP | 6428974 B1 | 11/2018 |
| WO | WO 2018/139620 A1 | 8/2018 |
| WO | WO 2018/169085 A1 | 9/2018 |
| WO | WO 2019/180852 A1 | 9/2019 |

* cited by examiner

PLATED STEEL

TECHNICAL FIELD OF THE INVENTION

The present invention relates to a plated steel.

Priority is claimed on Japanese Patent Application No. 2019-080289, filed on Apr. 19, 2019, the content of which is incorporated herein by reference.

RELATED ART

Recently, in the building material field or the like, the development of a hot-dip Zn—Al—Mg plated steel sheet has progressed.

Patent Document 1 discloses a hot-dip Al—Zn based plated steel sheet including a plating layer, in which the plating layer includes, by mass %, Al: 25% to 90% and Sn: 0.01% to 10% and further includes 0.01% to 10% of one kind or more selected from the group consisting of Mg, Ca, and Sr.

Patent Document 2 discloses a chemical conversion steel sheet, in which a hot-dip Zn—Al—Mg alloy plated steel sheet where the proportion of [Al/Zn/$Zn_2$Mg ternary eutectic structure] in an outermost surface of a plating layer is 60 area % or more is a substrate, the plating layer surface is covered with a precipitate layer including at least one kind selected from the group consisting of Ni, Co, Fe, and Mn and where a total adhesion amount of Ni, Co, and Fe is in a range of 0.05 mg/m² to 5.0 mg/m² and an adhesion amount of Mn is in a range of 0.05 mg/m² to 30 mg/m², a phosphate film formed of a phosphate crystal having an average grain size of 0.5 μm to 5.0 μm, and a chemical conversion film where a valve metal oxide or hydroxide and a valve metal fluoride are present together, the phosphate crystal rises from the plating layer while a base portion is buried in the plating layer, and the chemical conversion film is an organic resin film formed on an interface reaction layer at an interface with the plating layer or the precipitate layer exposed between the phosphate crystal grains.

Patent Document 3 discloses a zinc-based alloy-plated steel including a zinc-based alloy plating layer that is formed on a surface of a steel, in which the zinc-based alloy plating layer includes, by mass %, Mg: 1% to 10%, Al: 2% to 19%. Si: 0.01% to 2%, Fe: 2% to 75%, and a remainder consisting of Zn and unavoidable impurities.

However, it cannot be said that Patent Documents 1 to 3 conducted a sufficient investigation on sacrificial corrosion resistance of a plated steel sheet, in particular, sacrificial corrosion resistance of a plated steel sheet when a chemical conversion film or an electrodeposition film (hereinafter, also collectively referred to as "coating film") is formed on the plated steel sheet and corrosion propagates into the coating film.

Under these circumstances, it is desired to develop a plated steel sheet having excellent sacrificial corrosion resistance (sacrificial corrosion resistance after the formation of a coating film).

PRIOR ART DOCUMENT

Patent Document

[Patent Document 1] Japanese Unexamined Patent Application, First Publication No. 2015-214747
[Patent Document 2] Japanese Patent No. 4579715
[Patent Document 3] Japanese Unexamined Patent Application, First Publication No. 2009-120947

DISCLOSURE OF THE INVENTION

Problems to be Solved by the Invention

The present invention has been made in consideration of the above-described circumstances, and an object thereof is to provide a plated steel having excellent sacrificial corrosion resistance.

Means for Solving the Problem

In order to achieve the object, the present invention adopts the following configurations.

(1) According to one aspect of the present invention, there is provided a plated steel including: a steel; and a plating layer that is provided on a surface of the steel, in which the plating layer includes, by mass %, Al: 5.00% to 35.00%, Mg: 2.50% to 13.00%, Fe: 5.00% to 40.00%, Si: 0% to 2.00%, Ca: 0% to 2.00%, and a remainder of Zn and impurities, and in a cross section of the plating layer, an area fraction of a Zn solid-solution $Fe_2Al_5$ phase in which 5% or more of Zn is solid-soluted is 10% to 60% and an area fraction of a $MgZn_2$ phase is 10% to 90%.

(2) In the plated steel according to (1), the plating layer may include, by mass %, Al: 10.00% to 30.00%.

(3) In the plated steel according to (1) or (2), the plating layer may include, by mass %, Mg: 4.00% to 11.00%.

(4) In the plated steel according to any one of (1) to (3), the plating layer may include, by mass %, Ca: 0.03% to 1.00%.

(5) In the plated steel according to any one of (1) to (4), in the cross section of the plating layer, the area fraction of the Zn solid-solution $Fe_2Al_5$ phase may be 20% to 60%.

(6) In the plated steel according to any one of (1) to (5), in the cross section of the plating layer, an area fraction of a Zn non-solid-solution $Fe_2Al_5$ phase in which a solid solution amount of Zn is less than 5% may be 10% or less.

(7) In the plated steel according to any one of (1) to (6), in the cross section of the plating layer, an area fraction of an Al—Zn dendrite mainly formed of an Al phase and a Zn phase may be 5% or less.

(8) In the plated steel according to any one of (1) to (7), in the cross section of the plating layer, an area fraction of a Zn/Al/$MgZn_2$ ternary eutectic structure may be 5% or less.

(9) In the plated steel sheet according to any one of (1) to (8), in the cross section of the plating layer, an area fraction of a FeAl phase may be 10% or less.

(10) In the plated steel according to any one of (1) to (9), in the cross section of the plating layer, an area fraction of a massive Zn phase may be 10% or less.

(11) In the plated steel according to any one of (1) to (10), in the cross section of the plating layer, an area fraction of a $Mg_2Si$ phase may be 10% or less.

Effects of the Invention

According to the aspect of the present invention, a plated steel having excellent sacrificial corrosion resistance can be provided.

EMBODIMENTS OF THE INVENTION

Figure 1:
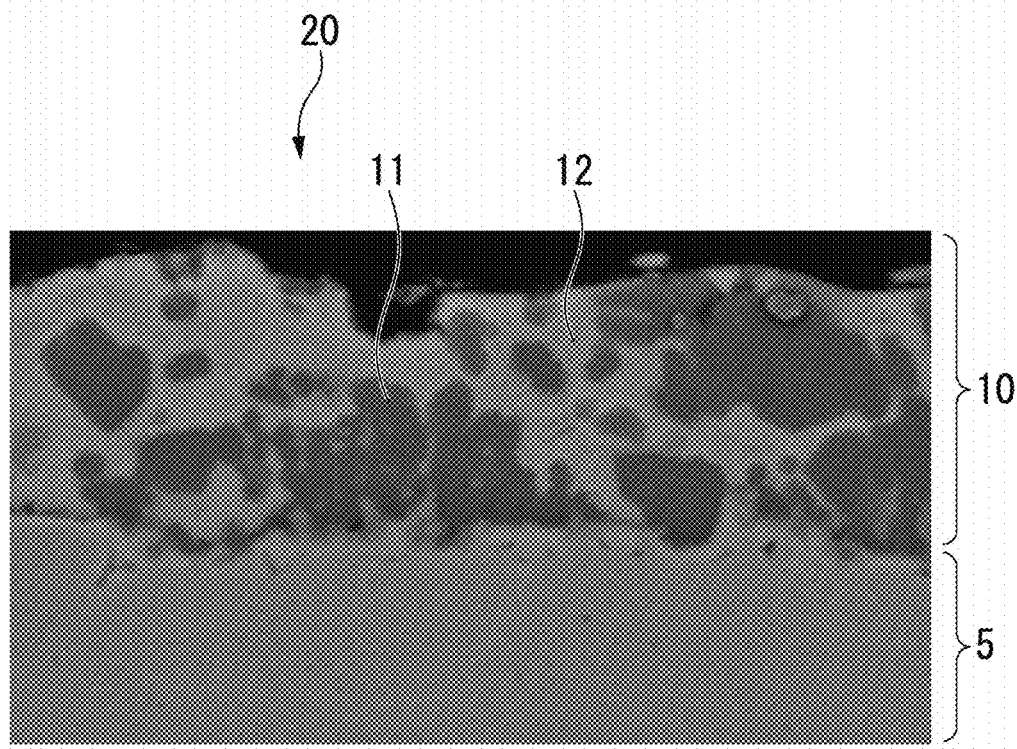
FIG. 1 is a SEM image showing a cross section structure of a plated steel according to an embodiment.

Hereinafter, a plated steel according to an embodiment of the present invention (the plated steel according to the embodiment) and a preferable manufacturing method thereof will be described.

[Plated Steel]

The plated steel according to the embodiment includes: a steel; and a plating layer that is provided on a surface of the steel, in which the plating layer includes, by mass %, Al: 5.00% to 35.00%,
Mg: 2.50% to 13.00%,
Fe: 5.00% to 40.00%,
Si: 0% to 2.00%,
Ca: 0% to 2.00%, and
a remainder of Zn and impurities, and in a cross section of the plating layer, the area fraction of a Zn solid-solution $Fe_2Al_5$ phase in which 5% or more of Zn is solid-soluted is 10% to 60% and the area fraction of a $MgZn_2$ phase is 10% to 90%.

<Steel>

The material properties of the steel as a base material of the plated steel is not particularly limited. General steel, Ni-precoated steel. Al-killed steel, or some high alloy steel can be used. In addition, the shape of the steel is also not particularly limited. For example, the steel is a steel sheet such as a hot-rolled steel sheet or a cold-rolled steel sheet. Hereinafter, in the embodiment, a case where the steel is a steel sheet (the plated steel sheet according to the embodiment) will be described.

<Plating Layer>

The plated steel according to the embodiment includes the plating layer that is formed on the surface of the steel.

(Chemical Composition)

Next, chemical components (chemical composition) in the plating layer will be described. In the following description of the chemical composition, unless specified otherwise, "%" represents "mass %".

Al: 5.00% to 35.00%

Al is an element that is necessary to contain an element other than Zn in the plating layer. Originally, in a Zn plating layer (Zn layer), another element is not likely to be contained, for example, it is difficult to contain a high concentration of Mg. However, by containing Al in the plating layer (Zn-based plating layer), a plating layer containing Mg can be manufactured.

When the Al concentration (Al content) is less than 5.00%, inclusion of an alloying element that imparts performance to the plating layer in addition to Mg tends to be difficult. In addition, Al has a low density, and thus a larger amount of an Al phase in terms of mass content is formed as compared to Zn. However, when the Al concentration is less than 5.00%, most of the plating layer tends to be a Zn phase. As a result, sacrificial corrosion resistance also deteriorates significantly. It is not preferable that the Zn phase is the main phase in the plating layer from the viewpoint of sacrificial corrosion resistance.

In addition, when the Al concentration is less than 5.00%, the $MgZn_2$ phase having poor plastic deformability is the primary crystal phase in the plating layer and thus is likely to grow coarsely. As a result, the workability of the plating layer tends to deteriorate significantly.

Accordingly, the Al concentration is 5.00% or more. The Al concentration is preferably 10.00% or more.

On the other hand, when the Al concentration increases, the proportion of the Al phase in the plating layer increases rapidly, and the proportion of the Zn solid-solution $Fe_2Al_5$ phase or the $MgZn_2$ phase necessary to impart sacrificial corrosion resistance decreases, which is not preferable. Therefore, the Al concentration is 35.00% or less. The Al concentration is preferably 30.00% or less.

Mg: 2.50% to 13.00%

Mg is an element that is necessary to impart sacrificial corrosion resistance. When Mg is added to a Zn-based plating layer, Mg forms $MgZn_2$ as an intermetallic compound. In order to sufficiently improve the sacrificial corrosion resistance of the plating layer, the minimum necessary Mg concentration is 2.50%. Therefore, the Mg concentration is 2.50% or more. The Mg concentration is preferably 3.00% or more. In addition, from the viewpoint of red rust resistance, the Mg concentration is preferably 4.00% or more.

On the other hand, when the Mg concentration is more than 13.00%, the amount of the $MgZn_2$ phase increases rapidly, the plastic deformability of the plating layer is lost, and the workability deteriorates, which is not preferable. Accordingly, the Mg concentration is 13.00% or less. The Mg concentration is preferably 11.00% or less.

Fe: 5.00% to 40.00%

When the Fe concentration is less than 5.00%, the Fe content is insufficient, and the amount of the $Fe_2Al_5$ phase is small, which is not preferable. In addition, when the Fe concentration is less than 5.00%, the area fraction of the Al—Zn dendrite not contributing to the improvement of the sacrificial corrosion resistance may be more than 5%, which is not preferable. Therefore, the Fe concentration is 5.00% or more. The Fe concentration is preferably 10.00% or more and more preferably 15.00% or more.

When the Fe concentration is more than 40.00%, a desired metallographic structure may not be formed in the plating layer according to the embodiment. In addition, as the amount of the Fe component increases, the potential increases, appropriate sacrificial corrosion resistance for the steel cannot be maintained, and the corrosion rate may increase, which is not preferable. Therefore, the Fe concentration is 40.00% or less. The Fe concentration is preferably 30.00% or less and more preferably 25.00% or less.

In addition, regarding the Fe concentration relative to the Al concentration. Fe/Al is preferably 0.9 to 1.2. By adjusting Fe/Al to be in the above-described range, the $Fe_2Al_5$ phase is likely to be formed.

When Fe/Al is less than 0.9, it is difficult to form a sufficient amount of $Fe_2Al_5$, and thus an excess amount of the dendrite mainly formed of the Al phase and the Zn phase may be formed. In addition, when Fe/Al is more than 1.2, a Fe—Zn-based intermetallic compound phase is likely to be formed. Even in this case, the $Fe_2Al_5$ phase is not likely to be formed.

Si: 0% to 2.00%

Si is an element that is effective for improving adhesion between the steel and the plating layer. Therefore, Si may be contained in the plating layer. Si does not need to be contained in the plating layer. Therefore, the lower limit of the Si concentration is 0%. The adhesion improvement effect by Si is exhibited when the Si concentration in the plating layer is 0.03% or more. Therefore, when Si is contained in the plating layer, the Si concentration is preferably 0.03% or more.

On the other hand, when the Si concentration in the plating layer is more than 2.00%, the adhesion improvement effect by Si is saturated. Therefore, even when Si is contained in the plating layer, the Si concentration is 2.00% or less. The Si concentration is preferably 1.00% or less.

Ca: 0% to 2.00%

Ca is an element that is effective for improving the chemical convertibility of the plated steel sheet. Therefore, in order to improve the chemical convertibility of the plated steel sheet, Ca may be contained in the plating layer. The sacrificial corrosion resistance improvement effect of Ca is poor. Therefore, Ca does not need to be contained in the plating layer. Therefore, the lower limit of the Ca concentration is 0%. The sacrificial corrosion resistance improvement effect by Ca is exhibited when the Ca concentration in the plating layer is 0.03% or more. Therefore, the Ca concentration is preferably 0.03% or more. The Ca concentration is more preferably 0.05% or more.

On the other hand, when the Ca concentration in the plating layer is more than 2.00%, the sacrificial corrosion resistance improvement effect by Ca is saturated. Therefore, even when Ca is contained in the plating layer, the Ca concentration is 2.00% or less. The Ca concentration is preferably 1.00% or less.

Remainder: Zn and Impurities

The remainder other than Al, Mg, Fe, Si, and Ca consists of Zn and impurities. Here, the impurities refer to elements that are unavoidably incorporated in the process of plating, and the total amount of the impurities may be about 3.00%. That is, the amount of the impurities in the plating layer may be 3.00% or less.

Examples of elements that may be contained as the impurities and the concentrations of the elements include Sb: 0% to 0.50%, Pb: 0% to 0.50%, Cu: 0% to 1.00%, Sn: 0% to 1.00%, Ti: 0% to 1.00%, Sr: 0% to 0.50%, Ni: 0% to 1.00%, and Mn: 0% to 1.00%. When the impurity elements having concentrations higher than the above-described ranges are contained in the plating layer, it is difficult to obtain the desired characteristics, which is not preferable.

The chemical composition of the plating layer is measured using the following method.

First, an acid solution is obtained by peeling and dissolving the plating layer with an acid containing an inhibitor that suppresses the corrosion of the base metal (steel). Next, by measuring the obtained acid solution by ICP analysis, the chemical composition of the plating layer can be obtained. The kind of the acid is not particularly limited as long as it is an acid that can dissolve the plating layer. The chemical composition is measured as the average chemical composition.

(Structure)

In a cross section (cross section in a thickness direction) of the plating layer of the plated steel sheet according to the embodiment, the area fraction of a Zn solid-solution $Fe_2Al_5$ phase in which 5% or more of Zn is solid-soluted is 10% to 60% and the area fraction of a $MgZn_2$ phase is 10% to 90%.

FIG. 1 is a SEM image showing a structure of a plated steel sheet 20 according to the embodiment. As shown in FIG. 1, in a plated steel sheet 20 according to the embodiment, when the cross section is observed using a SEM, the formation of a plating layer 10 on a surface of a steel 5 and the presence of a $Fe_2Al_5$ phase 11 in which 5% or more of Zn is solid-soluted and an $MgZn_2$ phase 12 in the plating layer 10 is observed.

Figure 2:
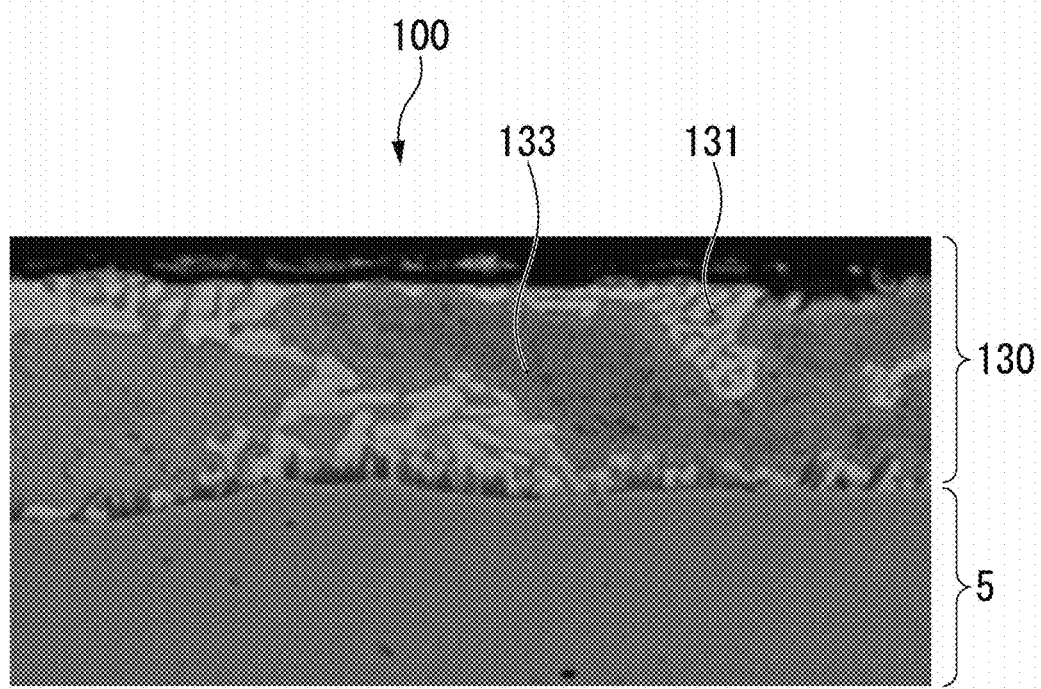
FIG. 2 is a SEM image showing a cross section structure of a plated steel sheet in the related art.

FIG. 2 is a SEM image showing a structure of a plated steel sheet 100 in the related art. The plated steel sheet 100 in the related art shown in FIG. 2 is a hot-dip Zn—Al—Mg-based plated steel sheet, and by performing hot-dip Zn—Al—Mg-based plating on the steel 5, a hot-dip Zn—Al—Mg-based plating layer 130 is formed on a surface of the steel 5.

As shown in FIG. 2, the alloying process is not performed on the hot-dip Zn—Al—Mg-based plating layer 130 of the plated steel sheet 100 in the related art. A $Zn/Al/MgZn_2$ ternary eutectic structure 131 or an Al—Zn dendrite 133 accounts for most of the hot-dip Zn—Al—Mg-based plating layer 130, and a $Fe_2Al_5$ phase or an $MgZn_2$ phase are not observed.

Hereinafter, the structures in the plating layer of the plated steel sheet according to the embodiment will be described.

Area Fraction of $Fe_2Al_5$ Phase in which 5% or More of Zn is Solid-Soluted (Hereinafter, Also Referred to as "Zn Solid-Solution $Fe_2Al_5$ Phase"): 10 to 60%

In the plated steel sheet according to the embodiment, by performing an alloying process after a hot-dip plating process described below, a $Fe_2Al_5$ phase is formed in the plating layer, and 5% or more of Zn is solid-soluted in this $Fe_2Al_5$ phase.

The plating layer of the plated steel sheet according to the embodiment contains 10% or more of the Zn solid-solution $Fe_2Al_5$ phase such that suitable sacrificial corrosion resistance can be obtained. Therefore, the area fraction of the Zn solid-solution $Fe_2Al_5$ phase in the plating layer is 10% or more. The area fraction of the Zn solid-solution $Fe_2Al_5$ phase is preferably 20% or more.

On the other hand, when the area fraction of the Zn solid-solution $Fe_2Al_5$ phase in the plating layer is more than 60%, the sacrificial corrosion resistance improvement effect is saturated, which is not preferable. Therefore, the area fraction of the Zn solid-solution $Fe_2Al_5$ phase is 60% or less and preferably 50% or less.

The Zn solid-solution $Fe_2Al_5$ phase is an important structure from the viewpoint of obtaining sacrificial corrosion resistance and suitably preventing liquid metal embrittlement (LME) during spot welding (obtaining excellent LME resistance).

When 5% or more of Zn is solid soluted in the $Fe_2Al_5$ phase, an effect of significantly improving the sacrificial corrosion resistance of the $Fe_2Al_5$ phase can be obtained. A $Fe_2Al_5$ phase in which the solid solution amount of Zn is less than 5% (hereinafter, also referred to as "Zn non-solid-solution $Fe_2Al_5$ phase") does not have sufficient sacrificial corrosion resistance. Therefore, the area fraction of the Zn non-solid-solution $Fe_2Al_5$ phase is preferably as small as possible and is preferably 10% or less.

Area Fraction of $MgZn_2$ Phase: 10% to 90%

In order to obtain suitable sacrificial corrosion resistance, the area fraction of the $MgZn_2$ phase is 10% or more. The area fraction of the $MgZn_2$ phase is preferably 20% or more.

On the other hand, when the area fraction of the $MgZn_2$ phase is more than 90%, the area fraction of the Zn solid-solution $Fe_2Al_5$ phase decreases significantly, and it is difficult to obtain suitable sacrificial corrosion resistance. Therefore, the area fraction of the $MgZn_2$ phase is 90% or less. The area fraction of the $MgZn_2$ phase is preferably 80% or less.

Area Fraction of Remainder: 20% or Less

In order to obtain suitable sacrificial corrosion resistance, the area fraction of structures in the remainder other than the Zn solid-solution $Fe_2Al_5$ phase and the $MgZn_2$ phase is 20% or less. The area fraction of the remainder is preferably 15% or less and more preferably 10% or less.

Examples of the structures in the remainder include the above-described Zn non-solid-solution $Fe_2Al_5$ phase, the Al—Zn dendrite described below, the $Zn/Al/MgZn_2$ ternary eutectic structure, the FeAl phase, the massive Zn phase, and the $Mg_2Si$ phase. Each of these structures in the remainder will be described below. Since the Zn non-solid-solution $Fe_2Al_5$ phase is as described above, the description thereof will not be repeated.

Area Fraction of Dendrite (Al—Zn Dendrite) Mainly Formed of Al Phase and Zn Phase: 5% or Less When the plating layer is formed, in the process of cooling the steel sheet from a bath temperature after the hot-dip plating process described below, first, an Al primary crystal phase (α-(Zn,Al) phase crystallized as the primary crystal phase) is crystallized and grows dendritically (hereinafter, also referred to as "Al—Zn dendrite"). Next, by heating the steel sheet in a temperature range of 440° C. to 480° C. to perform the alloying process, most of the Al—Zn dendrite is substantially replaced with another structure, but a part of the Al—Zn dendrite remains even after the alloying process.

The Al—Zn dendrite does not preferably affect sacrificial corrosion resistance or LME resistance. Therefore, the area fraction of the Al—Zn dendrite is as small as possible. Therefore, in the plating layer of the plated steel sheet according to the embodiment, the area fraction of the Al—Zn dendrite is preferably 5% or less. The area fraction of the Al—Zn dendrite is more preferably 3% or less.

"Mainly" represents that about 91% or more of the Al phase and the Zn phase are contained in the dendrite, and 5% or less of Fe, 3% or less of Mg, and 1% or less of steel component elements (Ni, Mn) may be contained as the remainder other than the Al phase and the Zn phase.

Area Fraction of $Zn/Al/MgZn_2$ Ternary Eutectic Structure: 5% or Less

The $Zn/Al/MgZn_2$ ternary eutectic structure is a layered structure including a Zn layer, an Al layer, and a $MgZn_2$ layer that is formed of a Zn phase, an Al phase, and a $MgZn_2$ phase finally solidified in the outside of the Al primary crystal phase due to a Zn—Al—Mg-based eutectic reaction. The $Zn/Al/MgZn_2$ ternary eutectic structure also has the sacrificial corrosion resistance improvement effect, but the improvement effect is lower than that of the $Fe_2Al_5$ phase or the $MgZn_2$ phase. Therefore, the area fraction of the $Zn/Al/MgZn_2$ ternary eutectic structure is preferably as low as possible. Therefore, in the plating layer according to the embodiment, the area fraction of the $Zn/Al/MgZn_2$ ternary eutectic structure is preferably 5% or less. The area fraction of the $Zn/Al/MgZn_2$ ternary eutectic structure is more preferably 3% or less.

FeAl Phase: 10% or Less

The FeAl phase has poor sacrificial corrosion resistance, and thus is preferably as small as possible. Therefore, the area fraction of the FeAl phase is preferably 10% or less. The area fraction of the FeAl phase is more preferably 5% or less.

Massive Zn Phase: 10% or Less

The massive Zn phase is a structure that may be formed when the Mg content in the plating layer is low. When the massive Zn phase is formed, the blister width tends to increase. The area fraction is preferably as low as possible and is preferably 10% or less. The massive Zn phase is a phase different from the Zn phase in the $Zn/Al/MgZn_2$ ternary eutectic structure. The massive Zn phase has a dendritic shape and may also be observed to be circular in the cross section.

$Mg_2Si$ Phase and Other Intermetallic Compound Phases: 10% or Less Each

The $Mg_2Si$ phase is a phase that is formed when the Si addition amount is excessively large and promotes corrosion of the vicinity thereof such that red rust resistance may deteriorate. In order to secure sufficient red rust resistance, the area fraction of the $Mg_2Si$ phase needs to be limited to 10% or less.

In addition, other intermetallic compound phases do not preferably affect chemical convertibility. Therefore, the area fraction of the other intermetallic compound phases is preferably 10% or less and more preferably 5% or less. Examples of the other intermetallic compound phases include a $CaZn_{11}$ phase, an $Al_2CaSi_2$ phase, and an $Al_2CaZn_2$ phase.

Unless specified otherwise, "area fraction" in the embodiment refers to an arithmetic mean value when the area fraction of a desired structure in a plating layer cross section is calculated for selected five or more different samples. This area fraction represents the volume fraction in the plating layer in practice.

<Method of Measuring Area Fraction>

The area fraction of each of the structures in the plating layer is obtained using the following method.

First, a plated steel sheet as a target to be measured is cut into 25 (C)×15 (L) mm, is embedded in a resin, and is polished. Next, a cross sectional SEM image of the plating layer and an element distribution image by EDS are obtained. Regarding the area fractions of the constituent structures of the plating layer, that is, the Zn solid-solution $Fe_2Al_5$ phase, the $MgZn_2$ phase, the Zn non-solid-solution $Fe_2Al_5$ phase, the (Al—Zn) dendrite, the $Zn/Al/MgZn_2$ ternary eutectic structure, the FeAl phase, the massive Zn phase, the $Mg_2Si$ phase, and the other intermetallic compound phases, one visual field is imaged from each of five samples having different cross sectional EDS mapping images of the plating layers, that is, five visual fields (magnification: 1500-fold: 60 μm×45 μm/visual field) in total are imaged, and the area fraction of each of the structures is measured by image analysis.

The solid solution amount of Zn in the $Fe_2Al_5$ phase can be measured by measuring concentrations of component elements forming the $Fe_2Al_5$ phase by SEM-EDS or EPMA.

<Characteristics>

The plated steel sheet according to the embodiment has excellent sacrificial corrosion resistance by including the steel and the plating layer having the above-described characteristics.

In addition, the plated steel sheet according to the embodiment has excellent LME resistance by including the steel and the plating layer having the above-described characteristics.

[Method of Manufacturing Plated Steel Sheet]

Next, a method of manufacturing the plated steel sheet according to the embodiment will be described. Hereinafter, a case where the steel is a steel sheet will be described.

A method of manufacturing the plated steel sheet according to the embodiment includes: a hot-dip plating process of dipping a base steel sheet in a plating bath containing at least Al, Mg, and Zn to perform hot-dip plating; an alloying process of heating the hot-dip plated base steel sheet at 480° C. to 580° C. for 1 second to 15 seconds; and a cooling process of cooling the plated steel sheet to room temperature at an average cooling rate of 15° C./sec or faster.

<Hot-Dip Plating Process>

In the hot-dip plating process, a base steel sheet is dipped in a plating bath containing at least Al, Mg, and Zn to perform hot-dip plating.

In the hot-dip plating process, a so-called hot-dip plating method of adhering the plating bath to the base steel sheet surface and pulling up the base steel sheet from the plating bath to solidify the molten metal adhered to the base steel sheet surface is used.

(Plating Bath)

The composition of the plating bath is not particularly limited as long as it contains at least Al, Mg, and Zn, and raw materials are prepared and dissolved in the plating bath to achieve the composition of the above-described plating layer.

The temperature of the plating bath is preferably in a range of higher than 380° C. and 600° C. or lower and may be in a range of 400° C. to 600° C.

It is preferable that the base steel sheet surface is reduced by heating the base steel sheet in a reducing atmosphere before being dipped in the plating bath. For example, a heat treatment is performed in a mixed atmosphere of nitrogen and hydrogen at 600° C. or higher, desirably 750° C. or higher for 30 seconds or longer. After completion of the reduction treatment, the base steel sheet is dipped in the plating bath after being cooled to the temperature of the plating bath. The dipping time may be, for example, 1 second or longer. When the base steel sheet dipped in the plating bath is pulled up, the plating adhesion amount is adjusted by gas wiping. The adhesion amount is preferably in a range of 10 g/m² to 300 g/m² and may be in a range of 20 g/m² to 250 g/m².

<Alloying Process>

The method of manufacturing the plated steel sheet according to the embodiment includes the alloying process of heating the hot-dip plated base steel sheet at 480° C. to 580° C. for 1 second to 15 seconds.

In the alloying process, when the heating temperature (hereinafter, referred to as "alloying temperature") is lower than 480° C., the alloying process is slow and a desired structure is not formed in the plating layer, which is not preferable. Therefore, the alloying temperature is 480° C. or higher.

On the other hand, when the alloying temperature is higher than 580° C., alloying progresses excessively within a short period of time, and the alloying process cannot be suitably controlled, which is not preferable. In addition, when the alloying temperature is higher than 580° C., Fe and Zn form a Fe—Zn-based intermetallic compound which deteriorates red rust resistance, which is not preferable. In addition, when the Fe—Zn-based intermetallic compound is formed, the amount of Zn solid-soluted in the Fe—Al phase relating to sacrificial corrosion resistance decreases and a sufficient area fraction of the Zn solid-solution $Fe_2Al_5$ phase is not formed, which is not preferable. Therefore, the alloying temperature is 580° C. or lower.

In a case where the heating time (hereinafter, referred to as "alloying time") in the alloying process is shorter than 1 second, when the hot-dip plated base steel sheet is heated in a temperature range of 480° C. to 580° C., the progress of alloying is insufficient, which is not preferable. Therefore, the alloying time is 1 second or longer.

On the other hand, when the alloying time is longer than 15 seconds, alloying progresses significantly, which is not preferable. Therefore, the alloying time is 15 seconds or shorter.

In the alloying process, a heating method is not particularly limited. For example, a heating method such as induction heating can be used.

<Cooling Process>

It is preferable that the method of manufacturing the plated steel sheet according to the embodiment includes a process of cooling the plated steel sheet to 100° C. or lower (for example, about room temperature) at an average cooling rate of 15° C./sec or faster, after a process of pulling out the plated steel sheet from the plating bath and performing a alloying heat treatment.

Through the above-described processes, the plated steel sheet according to the embodiment can be manufactured.

The plated steel sheet according to the embodiment has excellent sacrificial corrosion resistance. In addition, the plated steel sheet according to the embodiment has excellent LME resistance.

EXAMPLES

Example 1

<Base Steel Sheet>

As a plated base steel sheet, a cold-rolled steel sheet (0.2% C-1.5% Si-2.6% Mn) having a sheet thickness of 1.6 mm was used.

TABLE 1A

| | | Plating Layer Components (mass %) | | | | | | | | Adhesion Amount of Single Surface of Plating Layer (g/m²) | Plating Bath Temperature (° C.) | Manufacturing Conditions | |
|---|---|---|---|---|---|---|---|---|---|---|---|---|---|
| | | | | | | | | Impurities | | | | Alloying Temperature (° C.) | Alloying Time (sec) |
| Classification | No. | Zn | Al | Mg | Fe | Fe/Al | Ca | Si | Kind of Element | Total % | | | | |
| Comparative Example | 1 | 88.3 | 4.00 | 3.00 | 4.30 | 1.08 | 0.20 | 0.20 | — | 0 | 40 | 440 | 520 | 15 |
| Comparative Example | 2 | 87.1 | 5.00 | 2.00 | 5.50 | 1.10 | 0.20 | 0.20 | — | 0 | 40 | 455 | 520 | 15 |
| Example | 3 | 87.0 | 5.10 | 2.50 | 5.40 | 1.06 | 0.00 | 0.00 | — | 0 | 45 | 430 | 520 | 15 |
| Example | 4 | 84.5 | 5.00 | 5.00 | 5.40 | 1.08 | 0.10 | 0.00 | — | 0 | 45 | 450 | 520 | 15 |
| Example | 5 | 71.9 | 9.90 | 7.00 | 11.00 | 1.11 | 0.10 | 0.00 | Ni:0.05, Mn0.1 | 0.15 | 40 | 470 | 520 | 15 |
| Example | 6 | 67.9 | 10.00 | 10.00 | 11.00 | 1.10 | 1.00 | 0.00 | Sb:0.08 | 0.08 | 40 | 500 | 520 | 15 |
| Comparative Example | 7 | 86.9 | 10.10 | 3.00 | 0.00 | 0.00 | 0.00 | 0.00 | — | 0 | 30 | 460 | — | — |
| Comparative Example | 8 | 61.5 | 10.50 | 3.00 | 25.00 | 2.38 | 0.00 | 0.00 | | | 30 | 460 | 600 | 15 |

TABLE 1A-continued

| Classification | No. | Plating Layer Components (mass %) | | | | | | | Impurities | | Adhesion Amount of Single Surface of Plating Layer (g/m²) | Plating Bath Temperature (° C.) | Manufacturing Conditions | |
|---|---|---|---|---|---|---|---|---|---|---|---|---|---|---|
| | | Zn | Al | Mg | Fe | Fe/Al | Ca | Si | Kind of Element | Total % | | | Alloying Temperature (° C.) | Alloying Time (sec) |
| Example | 9 | 73.9 | 11.00 | 3.00 | 12.10 | 1.10 | 0.00 | 0.00 | Ti:0.02 | 0.02 | 34 | 460 | 520 | 15 |
| Example | 10 | 70.3 | 11.10 | 6.50 | 12.10 | 1.09 | 0.00 | 0.00 | — | 0 | 31 | 460 | 520 | 15 |
| Example | 11 | 61.2 | 17.00 | 3.00 | 18.70 | 1.10 | 0.10 | 0.00 | — | 0 | 250.1 | 500 | 520 | 15 |
| Example | 12 | 57.5 | 17.50 | 6.10 | 18.70 | 1.07 | 0.20 | 0.00 | — | 0 | 10.9 | 480 | 520 | 15 |
| Example | 13 | 52.1 | 17.60 | 9.90 | 18.70 | 1.06 | 1.50 | 0.10 | Cu:0.1, Sr:0.05 | 0.15 | 25.6 | 520 | 520 | 15 |
| Comparative Example | 14 | 74.7 | 18.10 | 7.00 | 0.00 | 0.00 | 0.10 | 0.10 | — | 0 | 25 | 480 | 470 | 15 |
| Comparative Example | 15 | 52.1 | 18.20 | 7.10 | 22.50 | 1.24 | 0.10 | 0.00 | — | 0 | 25.7 | 480 | 580 | 35 |
| Comparative Example | 16 | 75.4 | 18.00 | 6.50 | 0.00 | 0.00 | 0.10 | 0.00 | — | 0 | 25 | 480 | — | — |

TABLE 1B

| Classification | No. | Plating Layer Components (mass %) | | | | | | | Impurities | | Adhesion Amount of Single Surface of Plating Layer (g/m²) | Plating Bath Temperature (° C.) | Manufacturing Conditions | |
|---|---|---|---|---|---|---|---|---|---|---|---|---|---|---|
| | | Zn | Al | Mg | Fe | Fe/Al | Ca | Si | Kind of Element | Total % | | | Alloying Temperature (° C.) | Alloying Time (sec) |
| Comparative Example | 17 | 74.6 | 19.20 | 6.10 | 0.00 | 0.00 | 0.10 | 0.00 | — | 0 | 25.4 | 480 | 600 | 20 |
| Comparative Example | 18 | 47.4 | 18.40 | 15.00 | 19.10 | 1.04 | 0.10 | 0.00 | — | 0 | 25.1 | 480 | 520 | 20 |
| Comparative Example | 19 | 14.9 | 10.00 | 3.00 | 72.00 | 7.20 | 0.10 | 0.00 | — | 0 | 42 | 500 | 670 | 20 |
| Example | 20 | 54.9 | 20.00 | 3.00 | 22.00 | 1.10 | 0.10 | 0.00 | — | 0 | 25.7 | 500 | 520 | 15 |
| Example | 21 | 51.7 | 20.10 | 6.10 | 22.00 | 1.09 | 0.10 | 0.00 | Pb:0.01 | 0.01 | 22.1 | 540 | 520 | 15 |
| Example | 22 | 44.9 | 19.90 | 13.00 | 22.00 | 1.11 | 0.10 | 0.00 | — | 0 | 23.1 | 510 | 520 | 15 |
| Example | 23 | 43.0 | 24.50 | 6.00 | 26.40 | 1.08 | 0.10 | 0.00 | Sn:0.02 | 0.02 | 29.8 | 510 | 520 | 15 |
| Example | 24 | 42.7 | 24.00 | 6.50 | 26.40 | 1.10 | 0.20 | 0.20 | — | 0 | 30.1 | 510 | 520 | 15 |
| Comparative Example | 25 | 41.0 | 24.30 | 6.10 | 26.40 | 1.09 | 2.20 | 0.00 | — | 0 | 29.4 | 510 | 520 | 15 |
| Comparative Example | 26 | 40.5 | 24.10 | 6.50 | 26.40 | 1.10 | 0.20 | 2.30 | — | 0 | 25.4 | 510 | 520 | 15 |
| Comparative Example | 27 | 42.3 | 24.80 | 6.40 | 26.40 | 1.06 | 0.10 | 0.00 | — | 0 | 25.4 | 510 | — | — |
| Example | 28 | 38.5 | 28.00 | 2.50 | 30.80 | 1.10 | 0.10 | 0.10 | — | 0 | 29.1 | 510 | 520 | 15 |
| Example | 29 | 30.8 | 30.10 | 5.50 | 33.50 | 1.11 | 0.10 | 0.00 | — | 0 | 20.1 | 520 | 520 | 15 |
| Example | 30 | 23.4 | 30.00 | 10.10 | 33.50 | 1.12 | 1.00 | 2.00 | — | 0 | 19.5 | 540 | 540 | 15 |
| Example | 31 | 31.0 | 30.50 | 5.30 | 33.10 | 1.09 | 0.10 | 0.00 | — | 0 | 15.4 | 540 | 540 | 15 |
| Comparative Example | 32 | 17.2 | 36.00 | 7.00 | 39.60 | 1.10 | 0.20 | 0.00 | — | 0 | 11.4 | 580 | 520 | 15 |
| Comparative Example | 33 | Commercially Available Alloyed Galvanized Steel Sheet | | | | | | | | | | | | |

<Hot-Dip Plating Process>

The base steel sheet was cut into 100 mm×200 mm and subsequently was plated using a batch type hot-dip plating test apparatus. The sheet temperature was measured using a thermocouple spot-welded to a central part of the base steel sheet.

Before dipping in the plating bath, in a furnace having an oxygen concentration of 20 ppm or lower, the base steel sheet surface was heated and reduced at 860° C. in an atmosphere of $N_2$-5% $H_2$ gas and a dew point of 0° C. Next, the base steel sheet was air-cooled with $N_2$ gas such that the dipped sheet temperature reached the bath temperature +20° C., and then was dipped in the plating bath having a bath temperature shown in Tables 1A and 1B for about 3 seconds.

After dipping in the plating bath, the base steel sheet was pulled up at a pulling rate of 100 mm/sec to 500 mm/sec. During pulling, the plating adhesion amount was controlled by $N_2$ wiping gas.

<Alloying Process>

After controlling the plating adhesion amount with the wiping gas, the alloying process was performed on the plated steel sheet under conditions of an alloying temperature and an alloying time shown in Tables 1A and 1B. In the alloying process, an induction heating device was used.

<Cooling Process>

The plated steel sheet was cooled from the alloying temperature to room temperature by being cooled under conditions shown in Tables 1A and 1B after the alloying process.

The composition of the plating layer was investigated using the above-described method. The results are as shown in Tables 1A and 1B.

<Structure Observation>

In order to investigate the structure configuration of the plating layer, the prepared sample was cut into 25 (C)×15 (L) mm, was embedded in a resin, and was polished. Next, a cross sectional SEM image of the plating layer and an element distribution image by EDS were obtained. Regarding the area fractions of the constituent structures of the plating layer, that is, the Zn solid-solution $Fe_2Al_5$ phase, the $MgZn_2$ phase, the Zn non-solid-solution $Fe_2Al_5$ phase, the (Al—Zn) dendrite, the $Zn/Al/MgZn_2$ ternary eutectic structure, the FeAl phase, the massive Zn phase, the $Mg_2Si$ phase, and the other intermetallic compound phases, one visual field was imaged from each of five samples having different cross sectional EDS mapping images of the plating layers, that is, five visual fields (magnification: 1500-fold) in total were imaged, and the area fraction of each of the structures was measured by image analysis.

The area fraction of each of the structures in each of Examples and Comparative Examples is shown in Tables 2A and 2B.

<Sacrificial Corrosion Resistance (Base Metal Corrosion Resistance)>

In each of Examples and Comparative Examples, the sacrificial corrosion resistance (base metal corrosion resistance) was evaluated using the following method.

The plated steel sheet according to each of Examples and Comparative Examples manufactured using the above-described method was cut into a size of 50 mm×100 mm, and a zinc phosphating process (SD5350 system, manufactured by Nippon Paint Industrial Coatings Co., Ltd.) was performed thereon. Next, an electrodeposition coating (PN110 POWERNICS (registered tradename) GREY, manufactured by Nippon Paint Industrial Coatings Co., Ltd.) having a thickness of 20 μm was formed on a Zn phosphate film and was baked at a baking temperature of 150° C. for a baking time of 20 minutes.

Next, crosscut damages (40×√2, two damages) were formed on the manufactured painted plated steel sheet such that the crosscut damages reached base metal. The plated steel sheet on which the crosscut damages were formed was provided for a combined cyclic corrosion test according to JASO (M609-91). The corrosion depth of the base metal after the test was measured using a micrometer and the average value thereof was obtained to evaluate sacrificial corrosion resistance.

When the number of cycles of JASO (M609-91) was 240, a case where the maximum base metal corrosion depth in a region within 5 μm from the crosscut damage was less than 0.1 mm was evaluated as "AA", a case where the maximum base metal corrosion depth in the region within 5 μm from the crosscut damage was 0.1 mm or more and less than 0.4 mm was evaluated as "A", a case where the maximum base metal corrosion depth in the region within 5 μm from the crosscut damage was 0.4 mm to 0.6 mm was evaluated as "B", and a case where the maximum base metal corrosion depth in the region within 5 μm from the crosscut damage was more than 0.6 mm was evaluated as "C".

A case where red rust did not occur in a region within 5 μm from the crosscut damage when the number of cycles of JASO was 240 was evaluated as "AA", a case where red rust occurred in the region within 5 μm from the crosscut damage when the number of cycles of JASO was 180 was evaluated as "A", a case where red rust occurred in the region within 5 μm from the crosscut damage when the number of cycles of JASO was 60 or more and less than 120 was evaluated as "B", and a case where red rust occurred in the region within 5 μm from the crosscut damage when the number of cycles of JASO was less than 60 was evaluated as "C".

TABLE 2A

| | | Cross Section Structure Configuration | | | | | | | | | Evaluation Result | |
|---|---|---|---|---|---|---|---|---|---|---|---|---|
| Classification | No. | $Fe_2Al_5$ Phase (Zn Solid-Solution) (Area %) | (A) $Fe_2Al_5$ Phase (Zn Non-Solid-Solution) (Area %) | $MgZn_2$ Phase (Area %) | (B) FeAl Phase (Area %) | (C) (Al-Zn) Dendrite (Area %) | (D) $Zn/Al/MgZn_2$ Ternary Eutectic Structure (Area %) | (E) Massive Zn (Area %) | (F) $Mg_2Si$ Phase (Area %) | (G) Other Intermetallic Compound (Area %) | Sum of (A) to (G) (Area %) | Base Metal Corrosion Resistance | Red Rust |
| Comparative Example | 1 | 4 | 16 | 0 | 0 | 0 | 80 | 0 | 0 | 0 | 80 | B | A |
| Comparative Example | 2 | 8 | 31 | 0 | 0 | 0 | 0 | 61 | 0 | 0 | 61 | B | A |
| Example | 3 | 15 | 66 | 0 | 0 | 0 | 0 | 19 | 0 | 0 | 19 | A | A |
| Example | 4 | 10 | 73 | 0 | 0 | 0 | 0 | 17 | 0 | 0 | 17 | A | AA |
| Example | 5 | 14 | 85 | 0 | 0 | 0 | 0 | 0 | 0 | 1 | 1 | A | AA |
| Example | 6 | 17 | 81 | 0 | 0 | 0 | 0 | 0 | 0 | 2 | 2 | A | AA |
| Comparative Example | 7 | 0 | 20 | 0 | 0 | 36 | 25 | 19 | 0 | 0 | 80 | B | A |
| Comparative Example | 8 | 8 | 24 | 0 | 39 | 0 | 9 | 20 | 0 | 0 | 68 | B | B |
| Example | 9 | 19 | 79 | 0 | 0 | 0 | 0 | 0 | 0 | 2 | 2 | A | A |
| Example | 10 | 20 | 80 | 0 | 0 | 0 | 0 | 0 | 0 | 0 | 0 | AA | AA |
| Example | 11 | 35 | 65 | 0 | 0 | 0 | 0 | 0 | 0 | 0 | 0 | AA | A |

TABLE 2A-continued

Cross Section Structure Configuration

| Classification | No. | Fe$_2$Al$_5$ Phase (Zn Solid-Solution) (Area %) | (A) Fe$_2$Al$_5$ Phase (Zn Non-Solid-Solution) (Area %) | MgZn$_2$ Phase (Area %) | (B) FeAl (Area %) | (C) (Al-Zn) Dendrite (Area %) | (D) Zn/Al/MgZn$_2$ Ternary Eutectic Structure (Area %) | (E) Massive Zn Phase (Area %) | (F) Mg$_2$Si Phase (Area %) | (G) Other Intermetallic Compound (Area %) | Sum of (A) to (G) (Area %) | Evaluation Result Base Metal Corrosion Resistance | Red Rust |
|---|---|---|---|---|---|---|---|---|---|---|---|---|---|
| Example | 12 | 34 | 66 | 0 | 0 | 0 | 0 | 0 | 0 | 0 | 0 | AA | AA |
| Example | 13 | 39 | 60 | 0 | 0 | 0 | 0 | 0 | 0 | 1 | 1 | AA | AA |
| Comparative Example | 14 | 0 | 41 | 0 | 0 | 38 | 21 | 0 | 0 | 0 | 59 | B | B |
| Comparative Example | 15 | 7 | 44 | 0 | 49 | 0 | 0 | 0 | 0 | 0 | 49 | B | B |
| Comparative Example | 16 | 0 | 29 | 0 | 0 | 37 | 34 | 0 | 0 | 0 | 71 | B | A |

TABLE 2B

Cross Section Structure Configuration

| Classification | No. | Fe$_2$Al$_5$ Phase (Zn Solid-Solution) (Area %) | (A) Fe$_2$Al$_5$ Phase (Zn Non-Solid-Solution) (Area %) | MgZn$_2$ Phase (Area %) | (B) FeAl (Area %) | (C) (Al-Zn) Dendrite (Area %) | (D) Zn/Al/MgZn$_2$ Ternary Eutectic Structure (Area %) | (E) Massive Zn Phase (Area %) | (F) Mg$_2$Si Phase (Area %) | (G) Other Intermetallic Compound (Area %) | Sum of (A) to (G) (Area %) | Evaluation Result Base Metal Corrosion Resistance | Red Rust |
|---|---|---|---|---|---|---|---|---|---|---|---|---|---|
| Comparative Example | 17 | 1 | 44 | 0 | 35 | 0 | 0 | 0 | 0 | 0 | 55 | B | A |
| Comparative Example | 18 | 8 | 92 | 0 | 0 | 0 | 0 | 0 | 0 | 0 | 0 | B | A |
| Comparative Example | 19 | 0 | 27 | 15 | 11 | 0 | 0 | 0 | 0 | 47 | 73 | C | A |
| Example | 20 | 41 | 59 | 0 | 0 | 0 | 0 | 0 | 0 | 0 | 0 | AA | A |
| Example | 21 | 48 | 51 | 0 | 0 | 0 | 0 | 0 | 0 | 1 | 1 | AA | AA |
| Example | 22 | 43 | 57 | 0 | 0 | 0 | 0 | 0 | 0 | 0 | 0 | AA | AA |
| Example | 23 | 44 | 55 | 0 | 0 | 0 | 0 | 0 | 0 | 1 | 1 | AA | AA |
| Example | 24 | 44 | 56 | 0 | 0 | 0 | 0 | 0 | 0 | 0 | 0 | AA | AA |
| Comparative Example | 25 | 32 | 56 | 0 | 0 | 0 | 0 | 0 | 0 | 12 | 12 | A | B |
| Comparative Example | 26 | 33 | 55 | 0 | 0 | 0 | 0 | 0 | 12 | 0 | 12 | A | B |
| Comparative Example | 27 | 0 | 33 | 0 | 0 | 40 | 27 | 0 | 0 | 0 | 67 | B | A |
| Example | 28 | 59 | 41 | 0 | 0 | 0 | 0 | 0 | 0 | 0 | 0 | AA | A |
| Example | 29 | 60 | 40 | 0 | 0 | 0 | 0 | 0 | 0 | 0 | 0 | AA | AA |
| Example | 30 | 60 | 32 | 0 | 0 | 0 | 0 | 0 | 8 | 0 | 8 | AA | AA |
| Example | 31 | 60 | 40 | 0 | 0 | 0 | 0 | 0 | 0 | 0 | 0 | AA | AA |
| Comparative Example | 32 | 72 | 28 | 0 | 0 | 0 | 0 | 0 | 0 | 0 | 0 | A | B |
| Comparative Example | 33 | Commercially Available Alloyed Galvanized Steel Sheet | | | | | | | | | | C | C |

It was found that, in Examples prepared from a predetermined plating bath composition under appropriate cooling conditions, suitable sacrificial corrosion resistance was obtained by obtaining predetermined structures.

On the other hand, at an example (Comparative Examples 7, 8, 14 to 19, and 27) where appropriate alloying was not performed and at an example (Comparative Examples 1 and 2) where Al or Mg were insufficient, a sufficient amount of the Fe$_2$Al$_5$ phase was not able to be formed, and the performance was poor. In particular, in Comparative Example 19 where the alloying temperature was high, the Fe—Zn phase was formed as the other intermetallic compound, and the Zn solid-solution Fe$_2$Al$_5$ phase was not formed. As a result, the sacrificial corrosion resistance was particularly low. In addition, at an example (Comparative Examples 25 and 26) where an excess amount of Ca or Si was contained, 10% or more of the intermetallic compound phases such as Mg$_2$Si or CaZn$_{11}$ deteriorating corrosion resistance were formed in the plating layer, and the corrosion resistance was poor. At an example (Comparative Example 18) where the Mg content was excessively large, the area fraction of the Zn solid-solution $Fe_2Al_5$ phase was less than 10%, the area fraction of the $MgZn_2$ phase was more than 90%, and thus the corrosion resistance was poor. At an example (Comparative Example 32) where the Al content was excessively large, more than 60% of the Zn solid-solution $Fe_2Al_5$ phase was formed, and the corrosion resistance was poor.

Example 2

In Example 2, LME resistance was investigated for some Examples used in Example 1. That is, the components, the structures, and the manufacturing conditions of the plated steel sheets used in Example 2 are shown in Tables 1A and 1B.

<LME Resistance>

Some of the plated steel sheets according to Examples used in Example 1 were cut into a size of 200 mm×20 mm and were provided for a hot tensile test where a tension rate was 5 mm/min and a chuck-to-chuck distance was 112.5 mm, and a stress-strain curve at 800° C. was measured. The strain amount was measured until the stress was reached maximum value in the obtained stress-strain curve.

A case where the strain amount was 80% or more with respect to a steel sheet sample on which plating was not performed was evaluated as "AA", and a case where the strain amount was 60% or less with respect to a steel sheet sample on which plating was not performed was evaluated as "A".

The evaluation results of LME resistance of Examples are shown in Table 3. The area fraction of each of the structures is shown in Tables 2A and 2B and thus is not shown in Table 3.

TABLE 3

| Classification | No. | LME Resistance |
|---|---|---|
| Example | 3 | A |
| Example | 4 | A |
| Example | 5 | A |
| Example | 6 | A |
| Example | 9 | A |
| Example | 10 | AA |
| Example | 11 | AA |
| Example | 12 | AA |
| Example | 13 | AA |
| Example | 20 | AA |
| Example | 21 | AA |
| Example | 22 | AA |
| Example | 23 | AA |
| Example | 24 | AA |
| Example | 28 | AA |
| Example | 29 | AA |
| Example | 30 | AA |
| Example | 31 | AA |

As shown in Table 3, in each of Examples, LME resistance was also suitable. In particular, in the examples where the area fraction of the Zn solid-solution $Fe_2Al_5$ phase was large, LME resistance was excellent.

BRIEF DESCRIPTION OF THE REFERENCE SYMBOLS

20: plated steel (plated steel sheet)
5: steel
10: plating layer
11: $Fe_2Al_5$ phase in which 5% or more of Zn is solid-soluted (Zn solid-solution $Fe_2Al_5$ phase)
12: $MgZn_2$ phase
100: plated steel sheet (steel in the related art)
130: hot-dip Zn—Al—Mg-based plating layer
131: Zn/Al/$MgZn_2$ ternary eutectic structure
133: Al—Zn dendrite

What is claimed is:

1. A plated steel comprising:
a steel; and
a plating layer that is provided on a surface of the steel, wherein the plating layer includes, by mass %,
Al: 5.00% to 35.00%,
Mg: 2.50% to 13.00%,
Fe: 5.00% to 40.00%,
Si: 0% to 2.00%,
Ca: 0% to 2.00%, and
a remainder of Zn and impurities, and
in a cross section in a thickness direction of the plating layer, an area fraction of a Zn solid-solution $Fe_2Al_5$ phase in which 5% by mass % or more of Zn is solid-soluted is 10% to 60% and an area fraction of a $MgZn_2$ phase is 10% to 90%.

2. The plated steel according to claim 1,
wherein the plating layer includes, by mass %, Al: 10.00% to 30.00%.

3. The plated steel according to claim 2,
wherein the plating layer includes, by mass %, Mg: 4.00% to 11.00%.

4. The plated steel according to claim 2,
wherein the plating layer includes, by mass %, Ca: 0.03% to 1.00%.

5. The plated steel according to claim 2,
wherein in the cross section of the plating layer, the area fraction of the Zn solid-solution $Fe_2Al_5$ phase is 20% to 60%.

6. The plated steel according to claim 2,
wherein in the cross section of the plating layer, an area fraction of a Zn non-solid-solution $Fe_2Al_5$ phase in which a solid solution amount of Zn is less than 5% by mass % is 10% or less.

7. The plated steel according to claim 1,
wherein the plating layer includes, by mass %, Mg: 4.00% to 11.00%.

8. The plated steel according to claim 7,
wherein the plating layer includes, by mass %, Ca: 0.03% to 1.00%.

9. The plated steel according to claim 7,
wherein in the cross section of the plating layer, the area fraction of the Zn solid-solution $Fe_2Al_5$ phase is 20% to 60%.

10. The plated steel according to claim 7,
wherein in the cross section of the plating layer, an area fraction of a Zn non-solid-solution $Fe_2Al_5$ phase in which a solid solution amount of Zn is less than 5% by mass % is 10% or less.

11. The plated steel according to claim 1,
wherein the plating layer includes, by mass %, Ca: 0.03% to 1.00%.

12. The plated steel according to claim 11,
wherein in the cross section of the plating layer, the area fraction of the Zn solid-solution $Fe_2Al_5$ phase is 20% to 60%.

13. The plated steel according to claim 11,
wherein in the cross section of the plating layer, an area fraction of a Zn non-solid-solution $Fe_2Al_5$ phase in which a solid solution amount of Zn is less than 5% by mass % is 10% or less.

14. The plated steel according to claim 1,
wherein in the cross section of the plating layer, the area fraction of the Zn solid-solution $Fe_2Al_5$ phase is 20% to 60%.

15. The plated steel according to claim 1,
wherein in the cross section of the plating layer, an area fraction of a Zn non-solid-solution $Fe_2Al_5$ phase in which a solid solution amount of Zn is less than 5% by mass % is 10% or less.

16. The plated steel according to claim 1,
wherein in the cross section of the plating layer, an area fraction of an Al—Zn dendrite mainly formed of an Al phase and a Zn phase is 5% or less.

17. The plated steel according to claim 1,
wherein in the cross section of the plating layer, an area fraction of a $Zn/Al/MgZn_2$ ternary eutectic structure is 5% or less.

18. The plated steel according to claim 1,
wherein in the cross section of the plating layer, an area fraction of a FeAl phase is 10% or less.

19. The plated steel according to claim 1,
wherein in the cross section of the plating layer, an area fraction of a massive Zn phase is 10% or less, wherein the massive Zn phase is a Zn phase which is not the Zn phase in a $Zn/Al/MgZn_2$ ternary eutectic structure, and which has dendritic shape or a circular shape in the cross section in a thickness direction of the plating layer observed by cross sectional EDS mapping images of the plating layer.

20. The plated steel according to claim 1,
wherein in the cross section of the plating layer, an area fraction of a $Mg_2Si$ phase is 10% or less.

* * * * *